United States Patent
Chang et al.

(10) Patent No.: US 9,272,686 B2
(45) Date of Patent: Mar. 1, 2016

(54) SEAT BELT BUCKLE ASSEMBLY

(71) Applicant: JOHNSON ELECTRIC S.A., Murten (CH)

(72) Inventors: Hang Fung Chang, Hong Kong (CN); Hang Cheong Ma, Hong Kong (CN); Daniel Ming Hong Wong, Hong Kong (CN)

(73) Assignee: Johnson Electric S.A., Murten (CH)

( * ) Notice: Subject to any disclaimer, the term of this patent is extended or adjusted under 35 U.S.C. 154(b) by 439 days.

(21) Appl. No.: 13/745,009

(22) Filed: Jan. 18, 2013

(65) Prior Publication Data

US 2013/0187372 A1   Jul. 25, 2013

Related U.S. Application Data

(63) Continuation-in-part of application No. 12/948,510, filed on Nov. 17, 2010.

(30) Foreign Application Priority Data

Jan. 20, 2012   (CN) .......................... 2012 1 0018982

(51) Int. Cl.
| | |
|---|---|
| *H02K 1/00* | (2006.01) |
| *B60R 22/20* | (2006.01) |
| *B60R 22/03* | (2006.01) |
| *B60R 22/195* | (2006.01) |
| *H02K 23/30* | (2006.01) |

(52) U.S. Cl.
CPC ................. *B60R 22/20* (2013.01); *B60R 22/03* (2013.01); *B60R 22/195* (2013.01); *H02K 23/30* (2013.01); *B60R 2022/1957* (2013.01)

(58) Field of Classification Search
USPC .................. 310/179–180, 184, 198; 280/802, 280/804–807; 297/480–481
See application file for complete search history.

(56) References Cited

U.S. PATENT DOCUMENTS

| | | | | |
|---|---|---|---|---|
| 4,765,651 | A | * | 8/1988 | Unger .......................... 280/804 |
| 5,661,355 | A | * | 8/1997 | Darceot ....................... 310/180 |
| 6,068,664 | A | | 5/2000 | Meyer et al. |
| 6,485,058 | B1 | * | 11/2002 | Kohlndorfer et al. ......... 280/808 |
| 6,883,834 | B2 | * | 4/2005 | Grabowski et al. ......... 280/801.2 |
| 6,969,088 | B2 | * | 11/2005 | Wang ............................ 280/802 |
| 7,178,835 | B2 | | 2/2007 | Hippel et al. |
| 8,777,268 | B2 | * | 7/2014 | Holbein et al. ............... 280/806 |
| 2006/0108786 | A1 | * | 5/2006 | Sugiyama et al. ......... 280/801.1 |
| 2007/0180685 | A1 | * | 8/2007 | Mahfoudh ...................... 29/606 |
| 2008/0290644 | A1 | * | 11/2008 | Spahn et al. .................. 280/806 |
| 2010/0026146 | A1 | * | 2/2010 | Wu et al. ..................... 310/68 R |
| 2011/0012418 | A1 | | 1/2011 | Mages |
| 2011/0062697 | A1 | * | 3/2011 | Kimura et al. ............. 280/801.2 |
| 2011/0147144 | A1 | * | 6/2011 | Ma et al. ....................... 188/162 |
| 2012/0299282 | A1 | * | 11/2012 | Holbein et al. ............... 280/806 |

* cited by examiner

*Primary Examiner* — Thanh Lam

(74) *Attorney, Agent, or Firm* — Muncy, Geissler, Olds & Lowe, P.C.

(57) ABSTRACT

A buckle assembly for a seat belt system includes a belt buckle, a transmission mechanism arranged to move the belt buckle from a first position to a second position, and an electric motor for driving the transmission mechanism. The motor includes a stator and a rotor rotatably mounted to the stator. The rotor includes a motor shaft, a commutator fixed to the motor shaft, a rotor core fixed to the motor shaft and rotor windings wound about teeth of the rotor core and electrically connected to segments of the commutator. The rotor windings include a plurality of winding units. Each winding unit includes at least two coils, the coils of each winding unit being wound about the same teeth and electrically connected to a same pair of segments, in parallel.

12 Claims, 3 Drawing Sheets

SEAT BELT BUCKLE ASSEMBLY

CROSS REFERENCE TO RELATED APPLICATIONS

This non-provisional patent application claims priority under 35 U.S.C. §119(a) from Patent Application No. 201210018982.8 filed in The People's Republic of China on Jan. 20, 2012, the entire contents of which are fully incorporated herein by reference and is a continuation-in-part of co-pending U.S. application Ser. No. 12/948,510, filed on Nov. 17, 2010 for which priority is claimed under 35 U.S.C. §120, the entire item of which are full incorporated herein by reference.

FIELD OF THE INVENTION

This invention relates to a buckle assembly for a seat belt system and in particular, to an electric motor used in the seat belt buckle assembly.

BACKGROUND OF THE INVENTION

Seat belt systems were developed to secure the occupant of a vehicle against harmful movement that may result during a collision or a sudden stop. The systems reduce the likelihood and severity of injury in a traffic collision by stopping the vehicle occupant from hitting hard against interior elements of the vehicle or other passengers (the so-called second impact), by keeping occupants positioned correctly for maximum benefit from the airbag and by preventing occupants being ejected from the seat of the vehicle.

A traditional seat belt system usually comprises a seat belt for restraining the occupant in the seat, a belt winder for tightening or loosing the seat belt, a tongue plate slidably arranged on the seat belt, and a belt buckle assembly which comprises a belt buckle detachably engagable with the tongue plate, and a driver for moving the belt buckle relative to the occupant. The movement of the belt buckle is able to adjust the effective length of the seat belt, so the belt buckle assembly is typically used as a belt tensioner.

FIG. 4 illustrates a winding scheme of a traditional permanent magnet direct current (PMDC) motor used for driving the belt buckle in a seat belt system. The rotor windings comprise a plurality of coils wound about teeth of the rotor core and electrically connected to segments of a commutator. For example, coil C1' is wound about teeth T1 and T2 and connected to segments S1 and S2. Coil C2' is wound about teeth T2 and T3 and connected to segments S2 and S3. The PMDC motor comprises two brushes to feed electric current to the rotor windings. The rotor windings form two parallel branches. When a coil such as coil C1' is open, one of the branches will be open. The motor as well as the seat belt system will malfunction. It is dangerous to drive a car having a malfunctioning seat belt buckle assembly.

Therefore, there is a desire for a seat belt buckle assembly with improved reliability.

SUMMARY OF THE INVENTION

Accordingly, the present invention provides a belt buckle assembly for a seat belt system, comprising: a belt buckle; a transmission mechanism for moving the belt buckle from a first position to a second position; and an electric motor for driving the transmission mechanism, the motor comprising a stator and a rotor rotatably mounted to the stator, the rotor comprising a motor shaft, a commutator fixed to the motor shaft, a rotor core fixed to the motor shaft and rotor windings wound about teeth of the rotor core and electrically connected to segments of the commutator, wherein the rotor windings comprise a plurality of winding units, each winding unit comprising at least two coils, the coils of each winding unit being wound about the same teeth and electrically connected to a same pair of segments, in parallel.

Preferably, the rotor windings are arranged in two layers, an inner layer and an outer layer, and each winding unit comprises two coils, one of the two coils being arranged in the inner layer, the other one of the two coils being arranged in the outer layer.

Alternatively, the two coils are spaced from each other.

Preferably, the rotor windings are wound by one continuous wire.

Alternatively, a part of the inner layer coils and a part of the outer layer coils are wound by one continuous wire, and the other part of the inner layer coils and the other part of the outer layer coils are wound by another continuous wire.

Preferably, at least one dummy slot is formed in a circumferential surface of each tooth of the rotor core.

Preferably, the rotor core comprises five teeth, and each tooth comprises two dummy slots formed in a circumferential surface of the tooth.

Preferably, the transmission mechanism comprises a flexible cable, a deflector which deflects the cable in the direction of the belt buckle, and a converting structure coupled between the motor and the cable for converting rotary movement of the motor into linear movement of the cable, the belt buckle being moved by the cable under the guidance of the deflector when the motor rotates.

Preferably, the converting structure comprises a threaded shaft rotated by the motor, and an internally threaded member engaged with the threaded shaft and fixed to the cable, the threaded member being constrained to move along the threaded shaft as the motor rotates to linearly move the cable.

Preferably, the threaded shaft is the motor shaft.

Preferably, the number of teeth is the same as the number of segments.

Preferably, the stator has two magnetic poles, the rotor core has five teeth, and the commutator has five segments.

In embodiments of the present invention, both coils of each winding unit of the rotor windings are wound about the same teeth and are electrically connected to the same segments in parallel. If one of the coils of a winding unit is open circuited, the current can still flow through the winding unit via the other coil. Testing results show that the motor still works, with only a slight performance loss. Therefore, a seat belt buckle assembly using the motor is more reliable and safer compared to traditional belt buckle assemblies.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
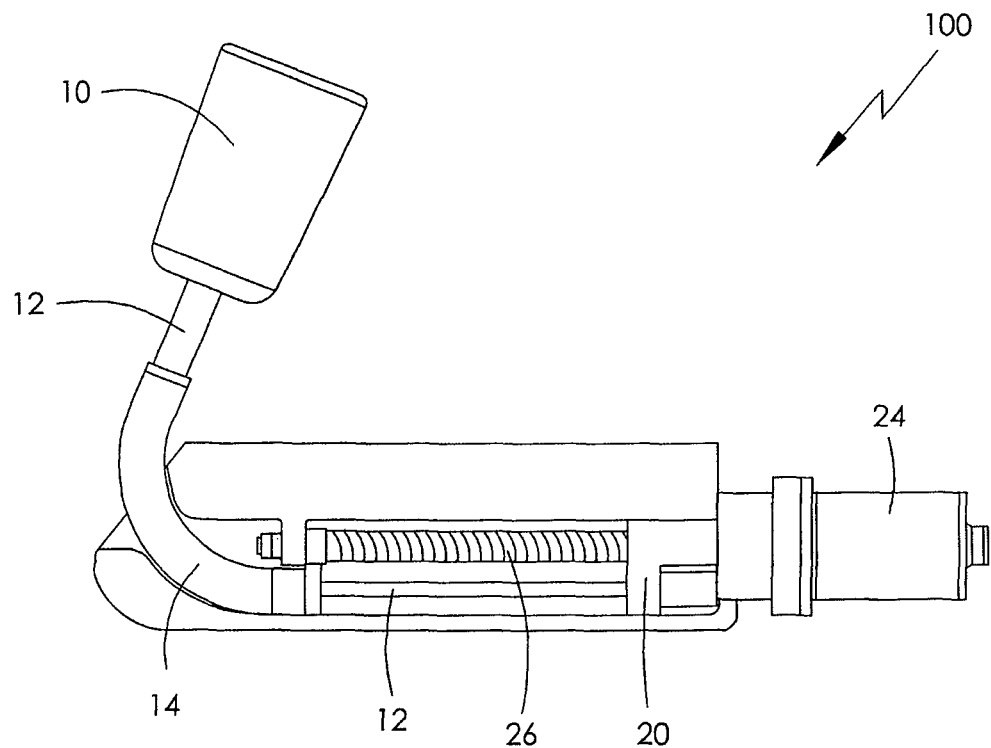
FIG. 1 illustrates a seat belt buckle assembly according to the preferred embodiment of the present invention.

FIG. 1 illustrates a belt buckle assembly 100 in a seat belt system for a vehicle according to a preferred embodiment of the present invention comprises a belt buckle 10 and a driver for moving the belt buckle 10. The seat belt system comprises a seat belt for restraining an occupant in an emergency. A first end of the seat belt is coupled to a belt winder for tightening or loosing the seat belt. The second end of the seat belt is coupled to a fastener which is fixed at a lower position on a body of the vehicle at one side of the seat. The seat belt passes through a guide anchor which is fixed at a higher position on the body on the same side of the seat as the fastener. A tongue plate is slidably arranged on the seat belt and detachably engagable with the belt buckle 10 on the other side of the seat.

The driver comprises a cable 12, an electric motor 24, and a deflector 14 which deflects the cable 12 in the direction of the belt buckle 10. The cable 12 is preferably made of metal and has a certain strength, hardness and flexibility. A first end of the cable 12 extends in the axial direction of the motor 24 and is fixed to an inner threaded member 20. The motor 24 has an outer threaded shaft 26 which is thready engaged with the inner threaded member 20 such that the inner threaded member 20 moves along the shaft in the axial direction when the shaft 26 rotates. A second end of the cable 12 is fixed to the belt buckle 10. The deflector 14 is fixed relative to the body of the vehicle. Preferably, the deflector 14 is a bent tube loosely sleeved on the cable 12 such that the cable 12 is movable relative to the deflector 14.

When the motor 24 rotates the shaft 26, the shaft 26 drives the inner threaded member 20 and the first end of the cable 12 fixed to the inner threaded member 20 moves in the axial direction and the second end of the cable 12 in turn moves the belt buckle 10 in the deflected direction under the guidance of the deflector 14. In an example, when an occupant is seated on the vehicle seat, the motor 24 drives the threaded member 20 and the first end of the cable 12 to axially move away from the motor 24 such that the belt buckle 12 is moved upwardly, which is convenient for the occupant to get the belt buckle 10. After the belt buckle 10 is engaged with the tongue plate, the motor 24 drives the threaded member 20 and the first end of the cable 12 to axially move towards the motor 24 such that the belt buckle 12 is moved downwardly, which tightens the seat belt so as to properly restrain the occupant.

The motor 24 is preferably a PMDC motor which comprises a stator and a rotor rotatably mounted to the stator. The rotor comprises the motor shaft 26, a commutator 243 fixed to the motor shaft, a rotor core 242 fixed to the motor shaft and rotor windings 244 wound about teeth T of the rotor core and electrically connected to segments S of the commutator. The stator comprises at least one permanent magnet 251 and at least two brushes in sliding contact with the commutator to feed electrical current to the rotor windings via the commutator. In a preferred example, the stator has two permanent magnetic poles.

Figure 2A:
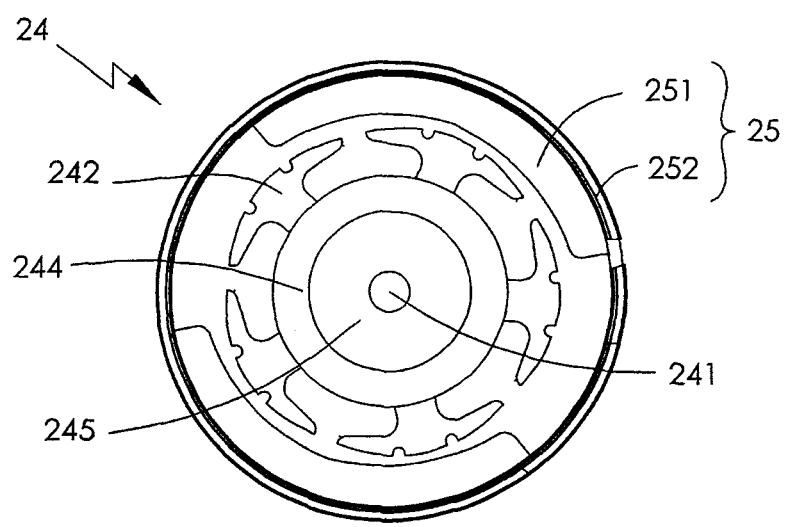
FIG. 2a is a cross sectional view of the motor of FIG. 2.
Figure 2:
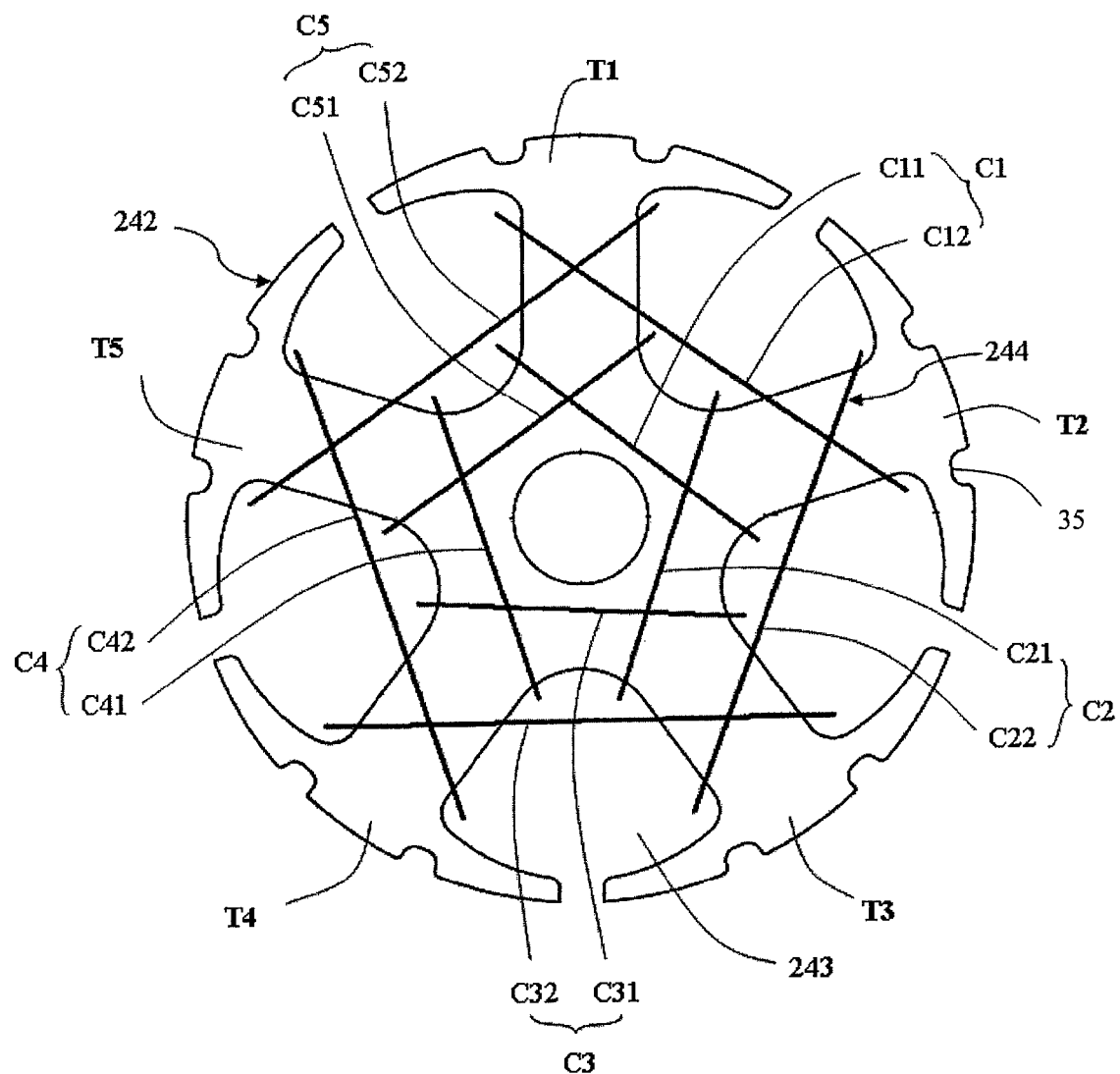
FIG. 2 illustrates a rotor core and rotor windings of a motor used in the belt buckle assembly of FIG. 1.

FIG. 2 illustrates the rotor core 242 and the rotor windings 244. The rotor core 242 comprises five teeth T1~T5. Winding slots 243 are formed by adjacent teeth and receive the rotor windings. The rotor windings 244 comprise ten coils Cn1 and Cn2, n=1, . . . , 5. The ten coils form five winding units Cn, n=1, . . . , 5, each of which comprises two coils. A first winding unit C1 comprises the coils C11 and C12. A second winding unit C2 comprises the coils C21 and C22. A third winding unit C3 comprises the coils C31 and C32. A fourth winding unit C4 comprises the coils C41 and C42, and a fifth winding unit C5 comprises the coils C51 and C52. Each of the coils of a winding unit is wound about the same teeth and electrically connected to the same pair of segments in parallel.

FIG. 2a is a cross section of the motor 24. The motor has a stator 25 having two magnetic poles formed by two arcuate permanent magnets 251 fitted to an inner surface of a motor housing 252. The commutator 245 is also shown, fitted to the motor shaft 241.

Figure 3:
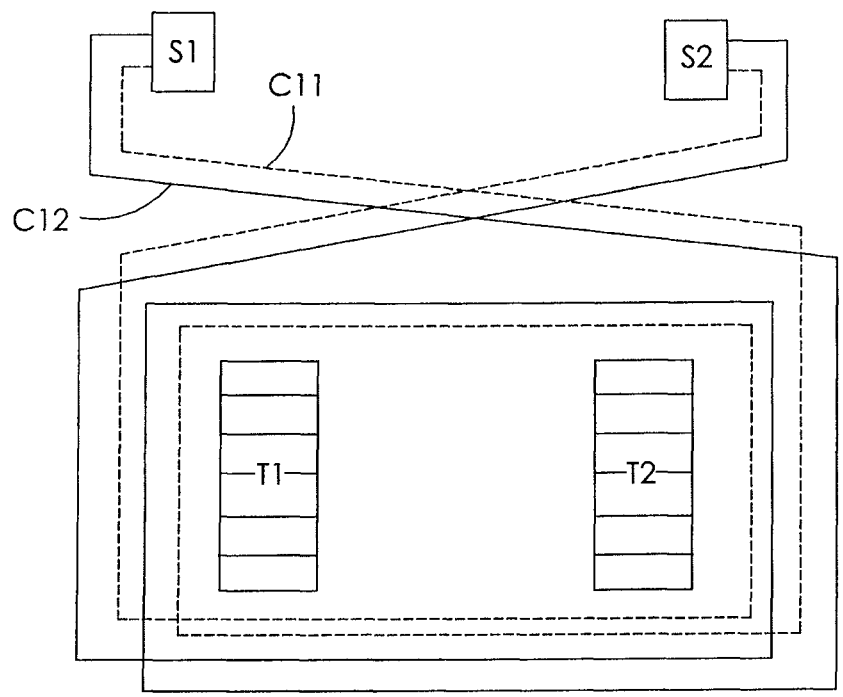
FIG. 3 illustrates a winding unit of the rotor windings of FIG. 2.
Figure 4:
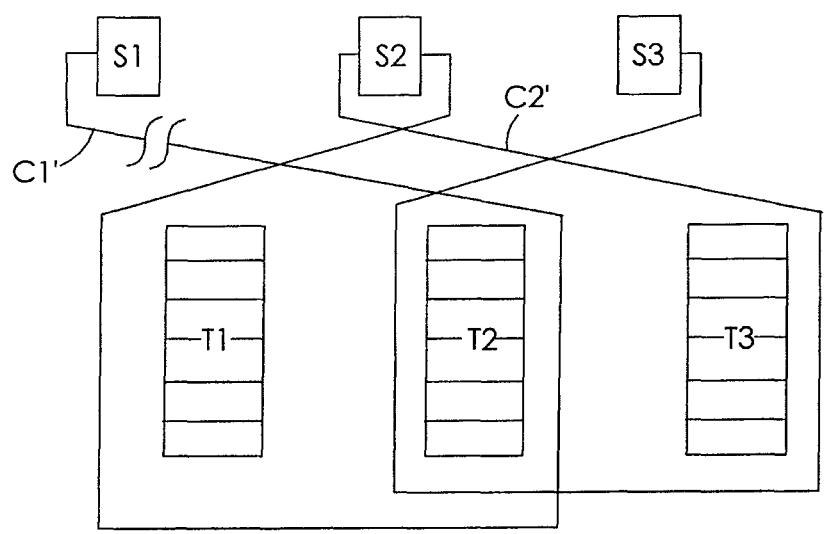
FIG. 4 illustrates rotor windings of a traditional motor used in a prior art seat belt buckle assembly.

FIG. 3 illustrates the first winding unit comprising coils C11 and C12. Both of the coils C11 and C12 are wound about teeth T1 and T2 and are connected to segments S1 and S2. Therefore, the coils C11 and C12 are electrically connected in parallel. If one of the coils C11 and C12 is open circuited, current may still pass through the first winding unit via the other coil. The motor will still work, with a slight performance loss. Therefore, a seat belt system using the motor is more reliable and safer compared to traditional seat belt systems. A coil is said to be open circuited or open when the wire forming the coil is broken such that current can not flow through the coil from one segment to the next.

In this embodiment, the rotor windings comprise inner layer windings and outer layer windings. The coils $C_{n1}$, n=1, . . . , 5, are arranged in the inner layer, while the coils $C_{n2}$, n=1, . . . , 5, are arranged in the outer layer. That is, for each winding unit, one of the two coils is disposed in the inner layer, and the other one of the two coils is disposed in the outer layer. During the winding process, the inner layer coils are wound first and then the outer layer coils are wound. Compared with the inner layer coils, the outer layer coils are further from the center of the rotor core. This reduces the likelihood that both coils of a single winding unit would be damaged at the same time as the outer layer provides physical protection for the inner layer. The rotor windings can be wound by using a single flyer winding machine. That is, the inner layer coils and the outer layer coils are wound by one continuous wire.

Alternatively, the rotor windings can be wound by using a dual flyer winding machine having two flyers which wind the windings simultaneously. That is, the inner layer coils are wound by two separate wires at the same time, and then, the outer layer coils are wound by the two wires at the same time. In other words, some of the inner layer coils and some of the outer layer coils are wound by one continuous wire. The remaining inner layer coils and the remaining outer layer coils are wound by another continuous wire. Generally, the inner layer coils and the outer layer coils wound by the same one wire are disposed opposite about the rotor shaft. Winding the rotor windings with two flyers improves the manufacturing efficiency.

In this embodiment, the number of segments is equal to the number of winding units and also equal to the number of teeth. During the winding process of the inner layer coils, the wire is attached to each segment. During the winding process of the outer layer coils, the wire is attached to each segment again.

Further more, two dummy slots 35 are formed in the circumferential surface of each tooth of the rotor core. The dummy slots 35 extend along a direction parallel to the direction of the winding tunnels, which in FIG. 2 is parallel to the axis of the motor. The dummy slots divide the circumference surface of each tooth into three parts. Vibration and noise is reduced by the dummy slots 35.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, each winding unit of the rotor windings may comprise more than two coils. Also, while the threaded shaft is described as being the motor shaft, it may be formed as a separate shaft coupled to the motor shaft, directly or through gears.

The invention claimed is:

1. A belt buckle assembly for a seat belt system, comprising:
    a belt buckle;
    a transmission mechanism for moving the belt buckle from a first position to a second position; and
    an electric motor for driving the transmission mechanism, the motor comprising a stator and a rotor rotatably mounted to the stator, the rotor comprising a motor shaft, a commutator fixed to the motor shaft, a rotor core fixed to the motor shaft and rotor windings wound about teeth of the rotor core and electrically connected to segments of the commutator, wherein the rotor windings comprise a plurality of winding units, each winding unit comprising at least two coils, the coils of each winding unit being wound about the same teeth and electrically connected to a same pair of segments in parallel.

2. The buckle assembly of claim 1, wherein the rotor windings are arranged in two layers, an inner layer and an outer layer, and each winding unit comprises two coils, one of the two coils being arranged in the inner layer, the other one of the two coils being arranged in the outer layer.

3. The buckle assembly of claim 1, wherein the two coils are spaced from each other.

4. The buckle assembly of claim 1, wherein the rotor windings are wound by one continuous wire.

5. The buckle assembly of claim 1, wherein a part of the inner layer coils and a part of the outer layer coils are wound by one continuous wire, and the other part of the inner layer coils and the other part of the outer layer coils are wound by another continuous wire.

6. The buckle assembly of claim 1, wherein at least one dummy slot is formed in a circumferential surface of each tooth of the rotor core.

7. The buckle assembly of claim 1, wherein the rotor core comprises five teeth, and each tooth comprises two dummy slots formed in a circumferential surface of the tooth.

8. The buckle assembly of claim 1, wherein the transmission mechanism comprises a flexible cable, a deflector which deflects the cable in the direction of the belt buckle, and a converting structure coupled between the motor and the cable for converting rotary movement of the motor into linear movement of the cable, the belt buckle being moved by the cable under the guidance of the deflector when the motor rotates.

9. The buckle assembly of claim 1, wherein the number of teeth is the same as the number of segments.

10. The buckle assembly of claim 1, wherein the stator has two magnetic poles, the rotor core has five teeth, and the commutator has five segments.

11. The buckle assembly of claim 8, wherein the converting structure comprises an outer threaded shaft rotated by the motor, and an inner threaded member engaged with the outer threaded shaft and fixed to the cable, the inner threaded member being constrained to move along the outer threaded shaft as the motor rotates to linearly move the cable.

12. The buckle assembly of claim 11, wherein the outer threaded shaft is the motor shaft.

* * * * *